United States Patent [19]

Arway et al.

[11] 4,023,182

[45] May 10, 1977

[54] VACUUM RETURN SYSTEM FOR INK JET PRINTING APPARATUS

[75] Inventors: George W. Arway, River Grove; Frank Eremity, Hanover Park, both of Ill.

[73] Assignee: A. B. Dick Company, Chicago, Ill.

[22] Filed: Aug. 22, 1975

[21] Appl. No.: 606,944

[52] U.S. Cl. .............................. 346/75; 346/140 A

[51] Int. Cl.² ........................................ G01D 15/18

[58] Field of Search ............. 346/75, 140; 239/126; 118/602

[56] References Cited

UNITED STATES PATENTS

| | | | |
|---|---|---|---|
| 3,761,953 | 9/1973 | Helgeson et al. | 346/75 |
| 3,798,656 | 3/1974 | Lowy et al. | 346/75 X |
| 3,930,258 | 12/1975 | Dick et al. | 346/75 |

OTHER PUBLICATIONS

Stroms K. F., Compound Hydraulic Line, IBM Tech. Disc. Bulletin, vol. 15, No. 7, Dec. 1972, p. 2152.

*Primary Examiner*—Joseph W. Hartary
*Attorney, Agent, or Firm*—Peter S. Lucyshyn

[57] ABSTRACT

A vacuum return ink system for an ink jet printing apparatus includes an ink/air separator comprising a housing having a chamber formed therein. A first inlet port of relatively large diameter connects the chamber via a short tube of similar diameter to the ink catcher of the printing apparatus used for accumulating unused ink. A second port of relatively large diameter is provided to connect the chamber via a tube of a similar diameter to a vacuum source. A third port of relatively small diameter is provided to connect the chamber via a tube of similar diameter to an evacuated ink return tank. A tubular section defining the third port is inserted into the housing with the end thereof extending to the floor of the chamber. Ink and air are drawn from the catcher into the chamber via the first port at a high rate of flow, thereby minimizing a buildup of ink at the catcher mouth. The ink having a higher inertial mass than the air is carried by gravity to the chamber floor where it is drawn into the small diameter tubular section and carried at a relatively low flow rate to the evacuated ink return tank, thereby minimizing solvent evaporation of the ink. The air flowing into the chamber from the catcher is carried therefrom to the vacuum source via the second port.

10 Claims, 5 Drawing Figures

Fig. 1.
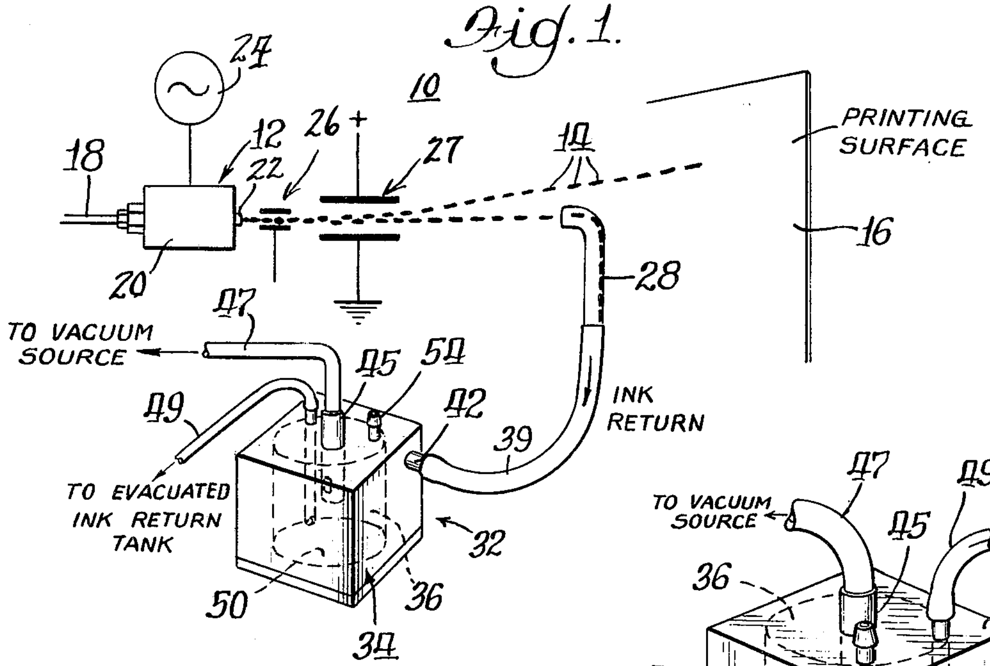
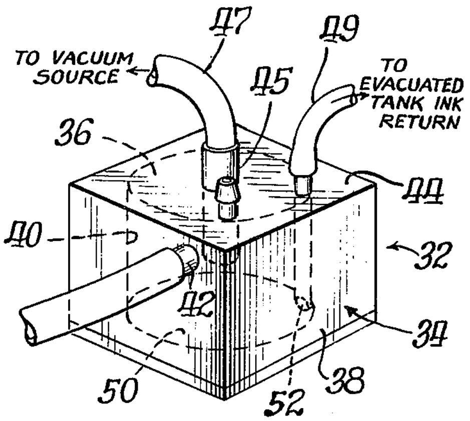
Fig. 2.
Fig. 3.
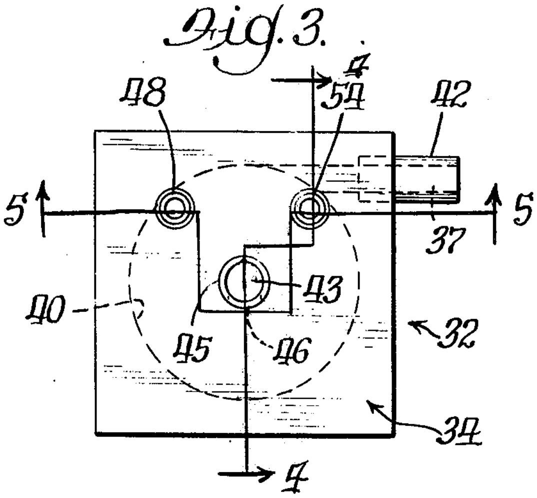
Fig. 4.
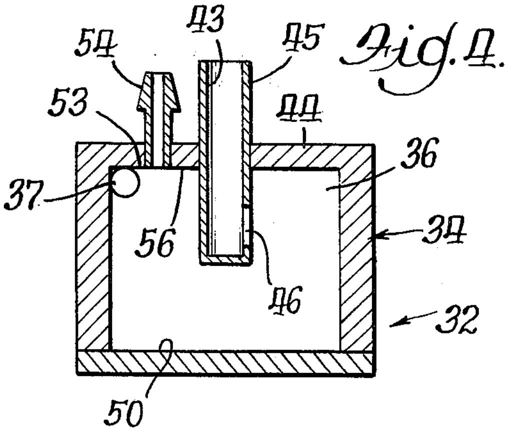
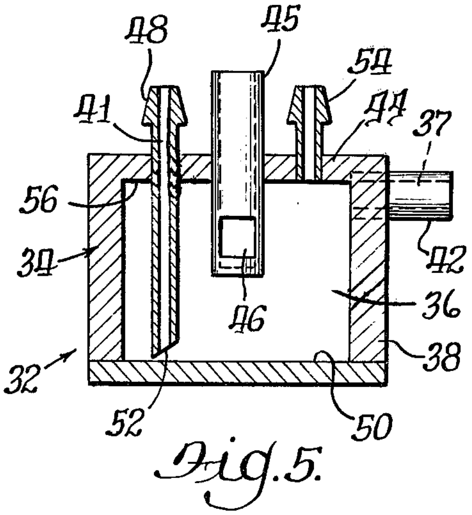
Fig. 5.

VACUUM RETURN SYSTEM FOR INK JET PRINTING APPARATUS

BACKGROUND OF THE INVENTION

This invention relates generally to ink jet printing apparatus and more particularly to a vacuum flow ink return system for returning unused ink to a recovery tank for reuse in the ink jet apparatus.

Presently, in ink jet printing apparatus, ink which has not been used for printing is projected into a prepositioned ink catcher and is returned therefrom to an ink reservoir for eventual reuse in the system.

In some apparatus the ink return system is of the gravity flow type. In more advanced apparatus, however, a vacuum flow system is used. In the latter system, a vacuum source is employed to evacuate an ink recovery tank whereby unused ink caught in the catcher is drawn to the tank.

A vacuum system of the type described must meet two conflicting requirements for efficient operation. In the first place, the vacuum flow through the ink return tube extending between the catcher and the return tank must be sufficiently large to prevent a buildup of ink on the catcher mouth and minimize ink misting thereat. On the other hand, the vacuum flow must be limited in order to minimize the evaporation rate of the solvent base of the ink being recycled in order to preserve the ink characteristics. The cost associated with the replenishment of the solvent base can be great and as such if too great an amount of solvent base is evaporated in the recycling process, the operational cost of the ink jet printing apparatus is also affected.

Many prior art vacuum return systems make use of a small diameter (i.e., 1/16 inch inner diameter) return tube which produces a low vacuum flow, limited solvent evaporation and insufficient flow to prevent an ink buildup on the catcher mouth. This can become a problem in the operation of the ink jet apparatus and may require relatively frequent shutdown thereof for cleaning and the like.

SUMMARY OF THE INVENTION

Accordingly, it is a primary object of the present invention to provide a vacuum ink return system for use in ink jet printing apparatus which overcomes the drawbacks of prior art vacuum ink return systems.

It is another object of the present invention to provide in a vacuum ink return system, means for producing a sufficiently high vacuum flow at the mouth of the ink catcher to minimize ink buildup thereon while producing also a sufficiently low vacuum flow for returning the ink to a return tank with a minimum solvent evaporation from the ink.

It is yet another object of the present invention to provide a system of the above-described type which has the further advantage over prior art vacuum ink return systems of reducing the compressed air consumption of the printer and minimizing the occurrence of return ink trapped in the catcher at shutdown of the printer from being exhausted back to the catcher mouth.

Briefly, a preferred embodiment of the vacuum ink return system according to the invention includes an ink/air separator device comprising a housing defining a cylindrically shaped chamber. A first tubular section defining a first port of a relatively large diameter extends into the side wall of the housing for communication with the chamber. The inner wall of the tubular section extends generally tangentially with respect to the inner curved wall of the chamber. The tubular section is connected via a short tube also of a relatively large diameter, to the catcher of the ink jet printing apparatus. A second port defined by a second tubular section of a relatively small diameter extending into the housing, is coupled to the evacuated ink return tank also by a small diameter tube. The second tubular section extends into the housing from an end wall thereof in the direction of the central axis of the chamber. When the end wall through which the port extends is the top wall of the housing, the tubular section extends downwardly to the inner bottom wall of the chamber. If the wall through which the port extends is the bottom wall, the tube ends flush therewith. A third port defined by a third tubular section of relatively large diameter extending also into an end wall of the housing is coupled via a long, relatively large diameter tube to a vacuum source. The last-mentioned tubular section extends into the chamber for communication therewith also in the direction of the axis thereof. The tubular section has an opening therein at a side portion thereof. The end of the tubular section extending into the chamber is sealed.

In operation, air and unused ink are drawn from the ink catcher through the first port into the chamber. The air continues to flow out of the chamber through the side opening of the third tubular section defining the third port and toward the vacuum source at a relatively rapid rate due to the large diameter tube connecting the vacuum source to the chamber. Due to its larger inertial mass, however, the ink entering the chamber via the first port is forced tangentially against the wall of the cylindrical chamber and is separated by gravity from the air flow. Gravity carries the ink to the inlet of the tubular section defining the second port. The evacuated return tank coupled thereto draws the ink into the tubular section and through the tube attached thereto to the return tank. The tube coupling the port to the return tank is narrow and therefore produces a low flow rate so that a minimum of evaporation of the solvent base of the ink occurs while the ink is being transported to the return tank. As can be seen, the ink/air mixture travels at a relatively high flow rate in a large diameter tube for only a short distance from the catcher to the chamber, thereby minimizing ink buildup at the catcher mouth and exposing the ink to solvent evaporation only for a brief period. Thereafter, the ink is drawn via a relatively narrow diameter tube at a relatively low flow rate from the chamber to the return tank thereby minimizing evaporation of the solvent base of the ink. Accordingly, both a minimum of ink buildup at the catcher mouth and ink solvent evaporation are produced by the vacuum ink return system according to the invention.

DESCRIPTION OF THE DRAWING

In the drawing:

FIG. 1 is a diagrammatical representation of ink jet printing apparatus including a vacuum ink return system having an ink/air separator according to the invention;

FIG. 2 is an enlarged perspective view of the ink/air separator of the vacuum ink return system according to the invention;

FIG. 3 is a top view of the ink/air separator of FIG. 2;

FIG. 4 is a sectional view of the ink/air separator of FIG. 3 taken along the line 4—4 thereof; and FIG. 5 is a sectional view of the ink/air separator of FIG. 3 taken along the line 5—5 thereof.

DETAILED DESCRIPTION OF THE DRAWING

Referring now to the drawing in greater detail wherein like numerals have been used throughout the various views to designate similar components, there is shown in FIG. 1 in diagrammatical form, ink jet printing apparatus designated generally by the numeral 10. The apparatus includes a nozzle assembly 12 from which ink drops such as 14 are projected toward a printing surface 16. Ink from a pressurized source (not shown) is provided to the nozzle assembly 12 via tube 18. An integral piezoelectric crystal surrounding the nozzle tube is vibrated by an ultra-sonic source 24 causing the stream of ink passing through the nozzle to separate into drops 14 at a corresponding rate. At the point of separation from nozzle assembly 12, each drop is within the electrostatic field produced by a charging assembly 26. A voltage of a first polarity applied to the charging assembly imparts a proportional voltage of opposite polarity to each drop as it passes therethrough. Downstream of the charging assembly a pair of deflector plates 27 disposed on opposite sides of the drop path exhibits a high static voltage field. As the drops pass through the field they are deflected according to the charge thereon toward the upper plate.

The drop trajectory and resulting landing pattern on the printing surface is thereby precisely controlled. Drops which do not play a part in the landing pattern on the printing surface are either uncharged or are charged differently so that they will assume a more level trajectory into the catcher 28. Drops received in the catcher are removed therefrom by vacuum ink return system 30 according to the invention. The drops are held in an ink return tank (not shown) until they can be recycled for use in the ink jet printing apparatus.

The vacuum ink return system 30 according to the invention includes an ink/air separator designated generally by the numeral 32. The ink/air separator provides the advantages of minimizing ink buildup on the catcher mouth and the evaporation of the solvent base of the ink being recycled.

A preferred embodiment of the separator comprises a housing 34 defining a cylindrical chamber 36 therein. A first relatively large diameter port 37 defined by tubular section 42 communicating with the chamber, is provided at a side wall 38 of the housing. The tubular section 42 extends substantially tangentially to the curved inner surface 40 of the chamber. A tube 39 of a similar inner diameter connects the section 42 to the ink drop catcher 28 of the ink jet printing apparatus.

A second port 43 of a relatively large diameter, defined by a tubular section 45 extending into upper wall 44 and into chamber 36 also is provided in the housing. The axis of the tubular section 45 is parallel to the central axis of the cylindrical chamber 36. The tubular section 45 extends into the chamber to approximately the center thereof and has an opening 46 therein at one side. The lower end of tubular section 45 is sealed. A tube having a similar inner diameter to that of section 45 couples the latter to a vacuum source (not shown).

A third opening or port 41 is provided by tubular section 48 which also extends into the chamber 36 from wall 44 of the housing. The tubular section 48 is of a relatively small diameter and extends downwardly into the chamber toward the bottom wall or floor 50 thereof. The end 52 of the tubular section 48 is cut at an angle with respect to floor 50, see FIG. 5. The tubular section 48 is connected via tube 49 to an evacuated ink return tank (not shown) whereat the unused ink is retained until such time as it may be replaced in the pressurized ink source used to supply ink to the nozzle assembly 12 of the ink jet printing apparatus.

A fourth opening 53 is also formed in the housing by a tubular section 54 which extends through wall 44 into chamber 36. The tubular section 54 has a relatively small inner diameter substantially the same as that of tubular section 48. The tubular section 54 is shorter than section 48, ending in chamber 36 substantially flush with the inner surface 56 of wall 44. As will be explained in greater detail hereinafter, the fourth opening 53 is used alternately with opening 41, depending upon the orientation of the chamber.

In the operation of the vacuum ink return system, ink deposited in the catcher 28 is drawn via tube 39 and port 37 into chamber 36. The air flows out of the chamber through opening 46 in tubular section 45 and via tube 47 to the vacuum source. The ink, having a larger inertial mass than the air, is forced against the curved inner wall surface of the chamber 36 and by gravity is carried downwardly to the floor 50 of the chamber. In the case wherein the ink/air separator device 32 is positioned with the wall 50 thereof acting as the chamber floor, use is made of port 41. In this case, port 53 is blocked. As such, ink carried downwardly toward the chamber floor 50 is drawn by the force of the evacuated ink return tank (not shown) coupled via tube 49 to the tubular section 48 into the lower end 52 of section 48 and to the tank for storage. It should be noted that the angular cut of end 52 of tubular section 48 provides efficient removal of the ink from the chamber floor. In the case wherein the ink/air separator is positioned with the inner wall 56 thereof serving as the bottom wall of the chamber, tubular section 48 is blocked and the tube 49 is attached to the tubular section 54. In both cases, gravity carries the ink to the "floor" of the chamber and the suction provided by the evacuated ink return tank draws the ink through the respective tubular section (48, 54), tube 49 and into the evacuated return tank.

It should be noted that the length of tube 39 is relatively small and as such the unused ink is drawn only a short distance from the catcher 28 through the large diameter, high flow rate tube 39 to the chamber. Thereafter, the ink and air flowing into the chamber are separated and the ink is carried via a longer relatively small diameter tube 49 which transmits very little air flow across the ink surface, thereby minimizing solvent evaporation to the ink return tank. The air on the other hand, is drawn to the vacuum source via a relatively large diameter tube 47 so that sufficient flow rate is maintained for removing the ink efficiently from the catcher mouth and thereby avoiding ink buildup and ink misting thereat.

In practice, the diameter of the relatively large diameter tubes and ports in chamber 36 is approximately twice the diameter of the small diameter ports and their corresponding tubular sections and tubes. In a preferred embodiment, the larger diameter port has an inner diameter of approximately ⅛ inch while the inner diameter of the small port is approximately 1/16 inch.

While the preferred embodiment of the ink/air separator 32 has been shown as having a block-like housing 34, this shape has been provided merely for ease in fabrication. The separator housing could have a cylindrical or other shape if desired and likewise perform the ink/air separation function with the advantages mentioned. Furthermore, while the curved wall of the chamber provides for highly efficient separation of the ink from the air being drawn into the chamber, a differently dimensioned chamber would also serve to produce the ink/air separating function, perhaps in a less efficient way, but nevertheless sufficiently to reduce considerably the ink buildup at the mouth of the catcher and the solvent evaporation of the ink being drawn to the return tank.

Essentially, requirements for fabricating an ink/air separator according to the invention are a chamber into which air and ink are drawn from the ink catcher through a relatively large diameter tube at a relatively high flow rate thereby to minimize ink buildup at the catcher mouth, a large diameter outlet port in the chamber to remove the air entering the chamber at a high flow rate and a relatively small diameter, low flow rate port for removing the ink separated in the chamber from the air, so as to minimize solvent evaporation thereof.

While the particular embodiment of the invention has been shown and described, it should be understood that the invention is not limited thereto since many modifications may be made. It is therefore contemplated to cover by the present application any and all such modifications as fall within the true spirit and scope of the appended claims.

What we claim is:

1. In an ink jet printing apparatus including an assembly for projecting ink droplets toward a printing surface and catcher means for receiving ink droplets not used in printing on the surface, a vacuum return ink system for removing ink from said catcher and storing such ink in an evacuated ink return tank, said vacuum return ink system including in combination:

a vacuum source and ink/air separator means interposed between said catcher means and said ink return tank for receiving unused ink and air from said ink catcher at a first flow rate, separating the ink and air and passing said unused ink to said evacuated ink return tank at a second, slower flow rate so as to minimize ink buildup at said catcher means and the evaporation of solvent from said ink, respectively, said means comprising a housing defining a chamber therein, first means defining an inlet opening of a first predetermined size communicating with said chamber and coupling the latter with said ink catcher, second means defining a first outlet opening of a similar size as said inlet opening, communicating with said chamber and coupling the latter with said vacuum source and third means defining a second outlet opening of a second predetermined size smaller than said first predetermined size, communicating with said chamber and coupling the latter with said evacuated ink return tank, said third means including conduit means extending into said chamber with an end thereof positioned near the floor of said chamber, whereby ink and air are drawn into said chamber through said inlet by said vacuum source at said first flow rate, the air being drawn out of said chamber through said first outlet opening and said ink being separated by gravity in said chamber and thereafter being drawn from said chamber to said evacuated ink return tank for storage therein through said conduit means and said second outlet opening at said second, slower flow rate, said ink and air passing through said chamber with no storage of ink therein.

2. A vacuum return ink system as claimed in claim 1 wherein said chamber is cylindrically shaped, wherein said first means comprise conduit means extending into said chamber tangentially to the curved surface thereof and wherein said second and third means each comprise conduit means extending into an end of said chamber to define said first and second outlet ports, respectively.

3. A vacuum return ink system as claimed in claim 2 wherein said second and third conduit means both extend into said chamber from a top wall thereof, the end of said second conduit means extending into said chamber toward the center thereof and the end of said third conduit means extending to a position near the floor of said chamber for drawing ink carried by gravity to said floor therefrom.

4. A vacuum return ink system as claimed in claim 2 wherein said third conduit means extends into said chamber from the base wall thereof with the end of said conduit means being substantially flush with said base wall for drawing ink carried by gravity to the base wall from said chamber to said evacuated ink return tank.

5. A vacuum return ink system as claimed in claim 2 wherein said first inlet opening is of a first diameter and wherein said second outlet opening is of a diameter approximately one-half the size of said first-mentioned openings.

6. A vacuum ink return system as claimed in claim 5 wherein the diameter of said first inlet opening is approximately ⅛ inch in diameter.

7. In an ink jet printing apparatus including an assembly for projecting ink droplets toward a printing surface and ink catcher means for receiving ink droplets not used in printing on the surface, a vacuum return ink system for removing ink from said catcher and storing said ink in an evacuated ink return tank, said vacuum ink system including in combination:

a vacuum source and an ink/air separator means interposed between said catcher means and said ink return tank for receiving unused ink and air from said catcher means, separating the ink and air and passing said unused ink to said evacuated ink return tank so as to minimize ink buildup at the catcher means and to minimize the evaporation of solvent from said ink, respectively, said means comprising a housing defining a chamber therein, first conduit means extending into said chamber and defining an inlet thereto, said first conduit means coupling said chamber to said ink catcher; second conduit means extending into said chamber and defining a first outlet thereto, said second conduit means coupling said first chamber to said vacuum source and third conduit means extending into said chamber and defining a second outlet thereto, said third conduit means coupling said chamber to said evacuated ink return tank, said vacuum source creating an air flow of a first predetermined rate in said first conduit means for drawing ink and air from said catcher to said chamber at a relatively high flow rate so as to minimize the buildup of unused ink at said catcher means, the air being drawn from said chamber at said first flow rate through said second conduit means to said vacuum source, said ink being separated by gravity in said chamber and thereafter drawn therefrom through said third conduit means to said evacuated ink return tank at a second predetermined flow rate less than said first flow rate so as to minimize the evaporation of solvent from said unused ink, said ink passing through said chamber without storage of ink therein.

8. A vacuum return ink system as claimed in claim 7 wherein said first conduit means is of a first relatively large diameter and wherein said third conduit means is of a relatively small diameter whereby the flow rate through first conduit means is correspondingly greater than in said third conduit means.

9. A vacuum return ink system as claimed in claim 8 wherein said chamber has a curved inner wall and wherein said first conduit means extends tangentially with respect to said wall, wherein said second conduit means extends into said housing toward the center thereof for drawing air from said chamber at said first flow rate and wherein said third conduit means extends into said chamber toward the base thereof for drawing ink separated by gravity in said chamber therefrom to said evatuated ink return tank at said second flow rate.

10. A vacuum return ink system as claimed in claim 8 wherein said first conduit means has a diameter of approximately twice the size of the diameter of said third conduit means wherein the diameter of said second conduit means is substantially the same size as the diameter of said first conduit means.

* * * * *

UNITED STATES PATENT OFFICE

CERTIFICATE OF CORRECTION

Patent No. 4,023,182 Dated May 10, 1977

Inventor(s) George W. Arway and Frank Eremity

It is certified that error appears in the above-identified patent and that said Letters Patent are hereby corrected as shown below:

Column 6, line 39, should read:

"said ink in an evacuated ink return tank, said vacuum return"

Column 8, line 7 should read:

"said evacuated ink return tank at said second flow rate."

Signed and Sealed this

*Twenty-fifth* Day of *October 1977*

[SEAL]

*Attest:*

RUTH C. MASON
*Attesting Officer*

LUTRELLE F. PARKER
*Acting Commissioner of Patents and Trademark*